April 3, 1962 R. C. SIEBERT 3,028,161

TONE ARM SUSPENSION AND BALANCING SYSTEM

Original Filed Jan. 26, 1959

INVENTOR.
RAYMOND C. SIEBERT
BY W. J. Shanley Jr.
ATTORNEY

United States Patent Office 3,028,161
Patented Apr. 3, 1962

3,028,161

TONE ARM SUSPENSION AND BALANCING SYSTEM

Raymond C. Siebert, Avon, N.Y., assignor to General Dynamics Corporation, Rochester, N.Y., a corporation of Delaware Original application Jan. 26, 1959, Ser. No. 789,173. Divided and this application Apr. 4, 1960, Ser. No. 19,905
10 Claims. (Cl. 274—23)

This invention relates to tone arms and more particularly to a novel tone arm suspension and balancing system designed to reduce or eliminate low frequency resonant oscillations therein.

This application is a division of my prior co-pending application, Serial No. 789,173, filed January 26, 1959, entitled Turntable.

Tone arm suspension and balancing systems commonly are characterized by suspension systems that allow the tone arm to move in both a horizontal and a vertical direction. Movement in the horizontal direction allows the pickup arm to track in the grooves of the record with minimum of distortion-producing drag, while freedom to move in the vertical direction is necessary to allow the placement of the arm upon the record. It is desirable to reduce the friction of the suspension in the vertical direction so that the needle may follow the grooves of a warped record without undue wear on the stylus and the record. Thus, it is highly desirable in such suspension systems to minimize the friction of the tone arm suspension system which allows this compound movement. Various systems have been utilized in the prior art but due to their complexity it has not always been possible to reduce the friction of the suspension system so as to come within the desirable limits now established for high fidelity reproduction of recorded information.

It is, therefore, an object of my invention to provide an improved suspension system for a tone arm which practically eliminates frictional drag in the tone arm suspension system, thus minimizing distortion and record and stylus wear.

It is a further object of my invention to provide an improved tone arm suspension system characterized by a single point pivotal suspension which allows unrestricted movement of the tone arm, within limits, thus tending to minimize friction in the suspension system which is usually associated with attempts to limit the movement of the tone arm to only a horizontal and vertical direction.

It is a further object of my invention to provide a balancing means to balance a single point pivotal suspension system in a longitudinal direction as well as in a transverse direction. Transverse balance of a pivotally suspended tone arm is necessary in order that the stylus can be adjusted to be normal to the plane of the record.

It is a further object of my invention to provide a simple and inexpensive means for viscously damping a single pivotally suspended tone arm which is compatible with such a suspension system.

With these and other objects in view, there has been illustrated on the accompanying drawings one form in which the invention may be conveniently embodied in practice.

In the drawings, FIG. 1 represents a top plan view of an improved tone arm suspension and balancing system.

Figure 1:
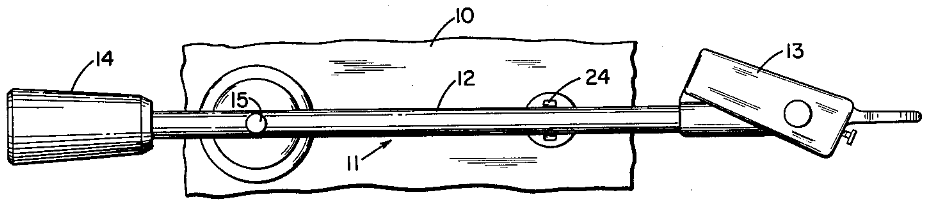

With reference to the drawings, the tone arm mounting plate is identified by reference character 10, and the tone arm which is secured to the mounting plate is identified in general by the reference character 11.

The tone arm 11 is comprised of a long, straight tubular arm 12 preferably made of a light material such as aluminum. A cartridge holding head 13 is secured to one end of arm 12, and a balancing weight 14 is secured to the opposite end of the arm.

Arm 12 is supported on shaft 15, the lower end of which is secured to inverted cup-shaped housing 16. Shaft 15 contains an axial bore which terminates short of its upper end and contains block 17 of material suitable to act as a low friction bearing point. Recess 30 in the lower surface of block 17, which forms a conical bearing surface, is provided for receiving conical bearing 18 of rod 19. Provisions are made for supporting rod 19 in a vertical position by being secured within the central bore of annular trough-shaped container 31. Container 31 is in turn secured to panel 10 by any of the well-known adjustable securing means such as by providing a threaded stud 20, which is received in the central bore of the container in a coaxial relationship with respect to rod 19. Nuts 21 and the interposed lock washer are provided for securing the entire assembly to supporting plate 10.

Flange 22 of rod 19 has a generally conical upper surface which is spaced a sufficient distance below bearing surface 18 so as not to contact inner surface 23 of inverted cup 16 when bearing surface 18 mates with the bearing surface 30 of block 17. This flange provides a stop to limit the movement of arm 12 so that the stylus (not shown) held within cartridge holding head 13 will not strike supporting plate 10 if it is accidentally dropped, or otherwise becomes disengaged from tone arm supporting clamp 24 which is secured to plate 10 in any convenient manner. Flange 22 in conjunction with screw 25 provides a means for retaining the tone arm on the pivot point so that it will not be accidentally removed during use or in being transported.

Aperture 26 is provided in the center of inverted cup 16 in coaxial alignment with the bore of shaft 15 so as to allow rod 19 to seat itself upon bearing surface 30 of block 17. Sufficient clearance is provided between the surface of rod 19 and the inner surface of shaft 15 and aperture 26 to allow tone arm 11 to rotate and pivot freely upon rod 19.

Annular trough-shaped container 31, which is coaxially arranged with respect to rod 19, contains a viscous damping material 32.

The damping action is provided by the inter-action of the sides 33 of cup-shaped member 16 with damping fluid 32. Depending and outwardly extending skirt 34 of cup 16 is concentrically arranged with respect to container 31 so as to conceal the viscous damping arrangement and provide a cover therefor.

Figure 2:
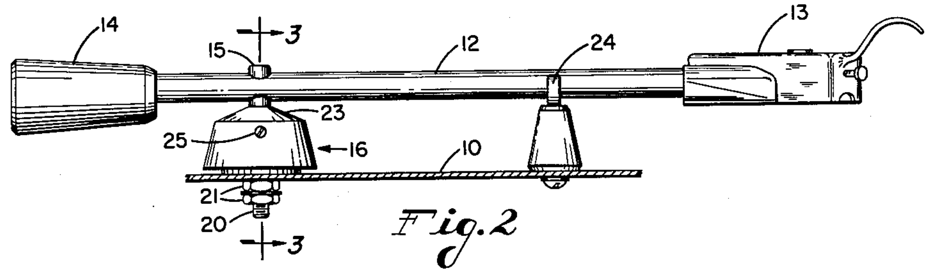
FIG. 2 is a side view of the tone arm suspension and balancing system as it appears when not in use.
Figure 3:
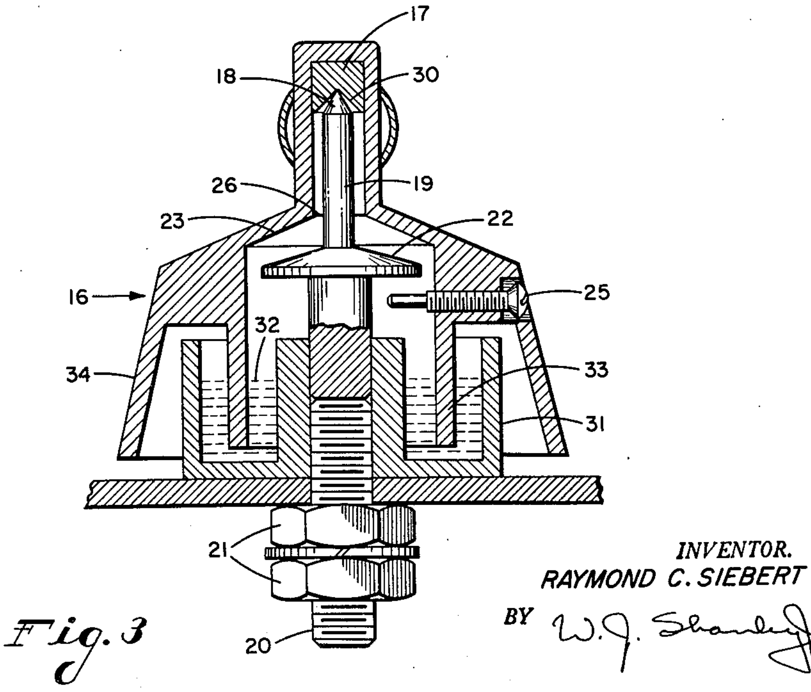
FIG. 3 is a partial sectional view taken along the line 3—3 of FIG. 1 showing the construction of the pivotal suspension system.

Balancing weight 14 is mounted for rotation about arm 12 and its center of gravity is eccentric thereto as may be seen by comparing FIGURES 1 and 2. This permits the weight 14 to be adjusted to balance arm 12 about its pivot point both as to lengthwise and as to transverse weight balance. Thus, by adjusting the transverse weight balance by rotating weight 14 in a clockwise or counterclockwise direction, the arm may be balanced so that the stylus of the cartridge (not shown) contained in cartridge holding head 13 will be normal to the plane of the record. The pressure upon the stylus may also be adjusted by the longitudinal movement of weight 14 on arm 12. Calibration marks on arm 12 may be provided in any convenient manner to aid in adjusting the desired pressure upon the cartridge stylus.

While the invention has been described in connection with a specific embodiment thereof, it will be understood that it is capable of further modification, and this application is intended to cover any variations, uses, or adaptations following, in general, the principles of the invention and including such departures from the present disclosure as come within known or customary practices in the art to which the invention pertains and as may be applied to the essential features hereinbefore set forth, and as fall within the scope of the invention or the limits of the appended claims.

Having thus described my invention, what I claim is:

1. In a tone arm suspension and balancing system; a fixed upright member having a pivot point at its upper end, means for supporting the tone arm from said pivot point, means connected to said tone arm for viscously damping the movement of said tone arm, and a balancing weight movably supported by said tone at a point on the opposite side of said supporting means from the cartridge supporting end of said arm, for effecting longitudinal and transverse balance of said tone arm about said pivot point.

2. In a tone arm suspension and balancing system; a fixed upright member having a pivot point at its upper end, means for pivotally supporting the tone arm from said pivot point, a fixed upright container, viscous damping fluid substantially filling said container, means connected to said tone arm and in contact with said damping fluid for damping the movement of said tone arm, and a balancing weight movably supported by said tone arm at a point on the opposite side of said supporting means from the cartridge supporting end of said arm, for effecting longitudinal and transverse balance of said tone arm about said pivot point.

3. In a tone arm suspension and balancing system; an elongated rod having a pivot point at its upper end, a tone arm supporting base, means for securing said rod to said base in an upright position, means for supporting the tone from said pivot point, an upright container having a fixed position with relation to said rod, viscous damping fluid substantially filling said container, means connected to said tone arm and in contact with said damping fluid for damping the movement of said tone arm, and a balancing weight supported by said tone arm at a point on said tone arm on the opposite side of said supporting means from the cartridge supporting end of said arm, said support being movable so as to effect longitudinal and transverse balance of said tone arm about said pivot point.

4. In a tone arm suspension and balancing system; an elongated rod having a pivot point at its upper end, a tone arm supporting base, means for securing said rod to said base in an upright position, means for supporting the tone arm from said pivot point, a container, means for securing said container to said base in an upright position, viscous damping fluid substantially filling said container, means connected to said tone arm and in contact with said damping fluid for damping the movement of said tone arm, and a balancing weight supported by said tone arm at a point on said tone arm on the opposite side of said supporting means from the cartridge supporting end of said arm, said support being movable so as to effect longitudinal and transverse balance of said tone arm about said pivot point.

5. The combination of claim 4 in which said supporting means includes a bearing surface positioned above the center of gravity of the unit which includes the tone arm and the balancing weight, said bearing surface being in engagement with said pivot point.

6. The combination of claim 5 in which said supporting means further includes a shaft secured to said tone arm and having an axis which intersects the axis of said tone arm at right angles, said bearing surface being recessed within said shaft a sufficient distance to fall above said center of gravity.

7. The combination of claim 6 in which said damping means includes an inverted cup-shaped member connected to said tone arm, said inverted cup-shaped member having its sides immersed in said damping fluid contained in said upright container.

8. The combination of claim 7 in which said damping means includes means to secure the base of said inverted member to said shaft of said supporting means in coaxial alignment, said inverted member having an aperture in said base for allowing said pivot member to pass upwardly through said inverted member so as to allow the engagement of said pivot point and said bearing surface, said aperture being sufficiently large so as to allow said tone arm to freely pivot in all directions on said pivot member.

9. The combination of claim 8 in which said upright container is an annular trough-shaped container which is coaxially arranged with respect to said pivot member so that said sides of said cup-shaped member are immersed in said damping fluid intermediate the sides of the trough, and said damping means further includes a skirt concentric with said inverted member which projects downwardly and outwardly from said base to cover said upright member.

10. The combination of claim 9 in which said balancing weight is slidably fitted on said tone arm to accomplish longitudinal balance, said weight being eccentrically mounted with respect to its center of gravity whereby transverse balance may also be accomplished by rotating said weight with respect to said arm.

References Cited in the file of this patent

UNITED STATES PATENTS 2,676,806 Bachman ---------------- Aug. 27, 1954

FOREIGN PATENTS 1,105,702 France ------------------ Dec. 7, 1955

UNITED STATES PATENT OFFICE

CERTIFICATE OF CORRECTION

Patent No. 3,028,161

April 3, 1962

Raymond C. Siebert

It is hereby certified that error appears in the above numbered patent requiring correction and that the said Letters Patent should read as corrected below.

Column 3, line 15, after "tone" insert -- arm --.

Signed and sealed this 7th day of August 1962.

(SEAL)
Attest:

ERNEST W. SWIDER
Attesting Officer

DAVID L. LADD
Commissioner of Patents